United States Patent
Liu (10) Patent No.: US 7,966,124 B2
(45) Date of Patent: Jun. 21, 2011

(54) NAVIGATION DEVICE AND ITS NAVIGATION METHOD FOR DISPLAYING NAVIGATION INFORMATION ACCORDING TO TRAVELING DIRECTION

(75) Inventor: Neng Liu, Hsinchu (TW)

(73) Assignee: Mitac International Corp., Taoyuan (TW)

( * ) Notice: Subject to any disclaimer, the term of this patent is extended or adjusted under 35 U.S.C. 154(b) by 923 days.

(21) Appl. No.: 11/870,078

(22) Filed: Oct. 10, 2007

(65) Prior Publication Data
US 2008/0091349 A1 Apr. 17, 2008

(30) Foreign Application Priority Data
Oct. 13, 2006 (TW) ............................... 95137781 A (51) Int. Cl.
*G01C 21/00* (2006.01)
(52) U.S. Cl. ........................................ 701/211; 701/200
(58) Field of Classification Search .................. 701/200, 701/211, 213–215; 340/995.1, 995.14
See application file for complete search history.

(56) References Cited

U.S. PATENT DOCUMENTS

| 5,757,359 | A  | * | 5/1998  | Morimoto et al. | 345/156 |
| 5,938,719 | A  | * | 8/1999  | Arakawa et al.  | 701/207 |
| 6,317,682 | B1 | * | 11/2001 | Ogura et al.    | 701/117 |
| 6,710,774 | B1 | * | 3/2004  | Kawasaki et al. | 345/419 |
| 2003/0113096 | A1 | * | 6/2003 | Taira et al.    | 386/46  |
| 2007/0055441 | A1 | * | 3/2007 | Retterath et al. | 701/200 |

* cited by examiner

*Primary Examiner* — Yonel Beaulieu
(74) *Attorney, Agent, or Firm* — Tim Tingkang Xia; Morris, Manning & Martin, LLP (57) ABSTRACT

A navigation method applied to a navigation device is used to display navigation information according to a traveling direction of the navigation device. The navigation information frame displayed is dynamically adjusted according to the traveling direction of the device, and in particular, the display position of the current position and the display scale of a corresponding displayed section of the navigation map are dynamically adjusted, so as to provide much more navigating route information and the points of interest in the identical size display area of a navigation information.

14 Claims, 7 Drawing Sheets

NAVIGATION DEVICE AND ITS NAVIGATION METHOD FOR DISPLAYING NAVIGATION INFORMATION ACCORDING TO TRAVELING DIRECTION

CROSS-REFERENCE TO RELATED APPLICATIONS

This non-provisional application claims priority under 35 U.S.C. §119(a) on Patent Application No(s). 095137781 filed in Taiwan, R.O.C. on Oct. 13, 2006, the entire contents of which are hereby incorporated by reference.

BACKGROUND

1. Field of Invention

The present invention relates to a navigation device and its navigation method, and in particular to a navigation device and its navigation method which dynamically adjust the displaying position of the current position and the displaying scale of the map in a navigation information frame according to current traveling direction of a navigation device.

2. Related Art

With the popularization of navigation device, more and more people start carrying the portable navigation device (PND). According to the positioning signals transmitted by the satellites of Global Positioning System (GPS), the navigation device retrieves the current position of the navigation device itself and displays a section the navigation map in a proper scale corresponding to the current position. A navigation route from the current position and to a destination set by a user is generated and displayed by the navigation device, and the navigation instruction required is also provided by the navigation device. The navigation device can also provide further information relevant to certain locations (points of interest, POI) on the navigation map and these information could relate to the various aspects of our daily life, such as living, transportation, travel and recreation, thus providing great convenience for the daily life of the user due to its portable design of light weight, compact size, and thin profile.

Take the navigation function of the vehicle navigation device as an example. In case that a user intends to travel from position A (current position) to position B (destination), and desires to know the optimal route from position A to position B (namely, the navigation route). Then, all the user has to do is to enter the position of the position B (destination) into a navigation device, then the navigation device will retrieve the position A (current position) through GPS at first and determine an optimal route from A to B through a navigation route planning function. The optimal route along with current position (which is changed with the movement of the navigation device) it is displayed in a navigation information frame in a display/screen of a navigation device. Such a navigation function assists the user to find out the roads in a stranger area.

Figure 3A:
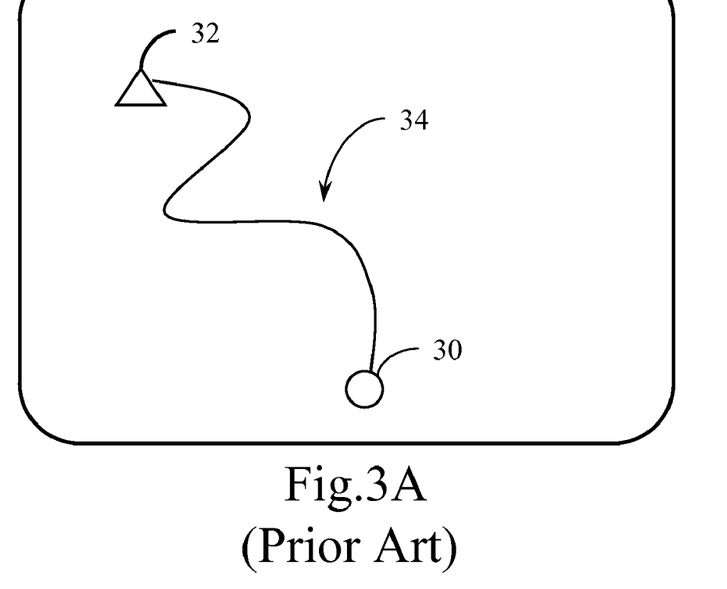
FIGS. 3A, 3B and 3C are the schematic diagrams of the navigation information frames generated by the prior art.
Figure 3B:
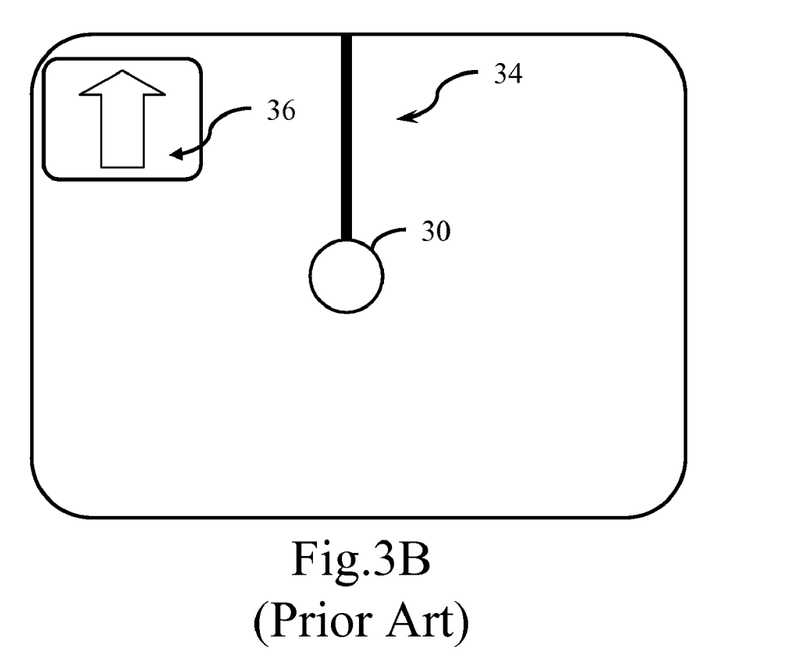
Figure 3C:
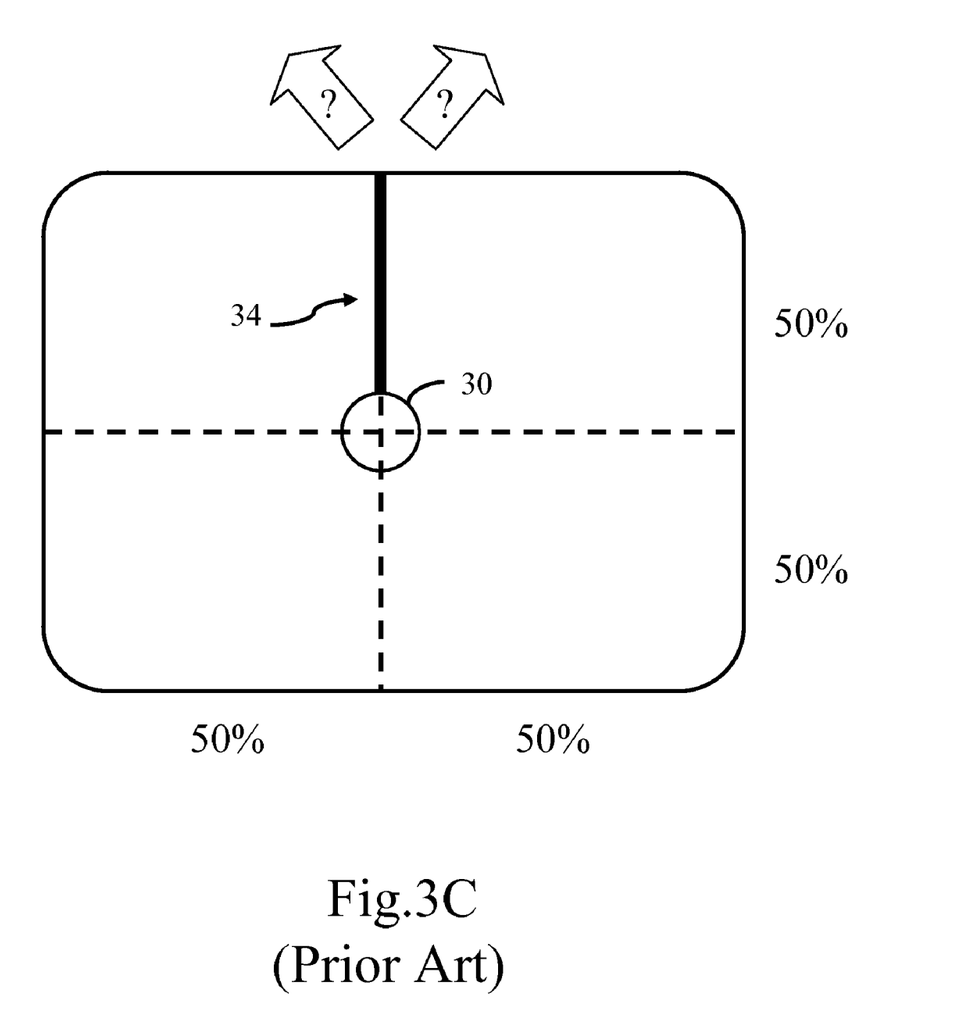

FIG. 3A to FIG. 3C show the navigation information frames provided by a navigation device in the prior art. As above-mentioned, after the user set the destination 32, the navigation device generates a navigation route 34 from the current position 30 to the destination 32, and displays the navigation route 34 along with a section of a navigation map in a navigation information frame in a display/screen of the navigation device, as shown in FIG. 3A. The user will see the summary of all the navigation routes 34 at first, and then the navigation device enters into the navigation mode. Usually, the ordinary navigation information frame is zoomed in to show the current position 30, a part of the navigation route 34, and the corresponding displayed section of the navigation map in an enlarged proportional scale as shown in FIG. 3B. The user can realize the moving direction of the current position 30 on the route 34, and he/she can also read points of interest around current position 30 in corresponding displayed section of the navigation map. As the user proceed to the destination 30 along with the navigation device, the navigation device may generates real-time a traveling direction icon 36 according to the relations of between the current position 30 and the navigation route 34, for indicating the user to follow the navigation route 34 to the destination 32.

Referring to FIG. 3C, in the prior art, the current position 30 is displayed at the center of the navigation information frame. That is, the displayed part of navigation route 34 and corresponding displayed section of the navigation map take the current position 30 as the center. 50% of the corresponding displayed section of the navigation map is shown on the left side of the current position 30, and the other 50% are shown right side. Similarly, 50% of the navigation map is shown upside and downside of the current position 30 respectively. This manner for displaying the navigation map result in that the rest of the navigation route 34 displayed on the display/screen is limited while the part been followed-up of the navigation route 34 are still displayed on the display/screen. For example, as shown in FIG. 3B, in case that the traveling direction icon 36 indicates a straight forward direction (toward the upper side of a navigation information frame), and in this condition, only 50% (the upper portion) of the navigation information frame is used to show the rest of the navigation route 34, the other 50% (the lower portion) of the navigation information frame is still occupied by the part been followed-up of the navigation route 34 (which part is not required in navigation) (as shown in FIG. 3c). As such, in the navigation involving much more complicated navigation route 34, in particular, in the application of vehicle navigation device, the user may be misled to take the wrong route and direction for not being able to know more rest of the navigation routes 34 in advance, and even more seriously, it could adversely affected the driving safety of the vehicle.

SUMMARY OF THE INVENTION

In view of the above-mentioned problems in the prior art, the objective of the invention is to provide a navigation device and navigation method applied in the navigation device for displaying navigation information according to a traveling direction of the navigation device, so that more navigation information required such as the direction and points of interest are provided to the user, and the user is able to make more preparations in proceeding to the destination.

To achieve the above-mentioned objective, the present invention provides a navigation device for displaying information according to a traveling direction of the navigation device. The navigation device includes a memory, a signal receiving unit, a central processing unit (CPU), and a displaying unit. The memory is used to store a navigation map. The signal receiving unit is used to receive at least one positioning signals from a positioning system, such as satellites of the Global Positioning System (GPS), via an antenna. The CPU is electrically connected to the signal receiving unit and the memory, and the CPU is used to retrieve the current position according to the positioning signals received. Furthermore, when a direction parameter according the traveling direction of the current position is changed, the CPU dynamically adjust a first displaying parameter of the current position and a second displaying parameter of the navigation map, and fetches the corresponding displayed area of the navigation map according to the second displaying parameter. The displaying unit is used to display the current position and corresponding displayed section of the navigation map in a navigation information frame according to the first display parameter and the second display parameter. When the navigation device is initialized, the central processing unit generates a navigation route for navigation from current position to a destination, and then the displaying unit displays the current position according to the first displaying parameter, and the central processing unit fetches the corresponding displayed section of the navigation map according to the second displaying parameter for the displaying unit to display in the navigation information frame.

In addition, the invention provides a navigation method applied in a navigation device for displaying navigation information according to the traveling direction of the navigation device including the following steps. First, the navigation device receives at least one positioning signal from a positioning system, and retrieves a current position of the navigation device according the positioning signal for determining the changes of a direction parameter according to the traveling direction of the current position. Then a destination is determined on a navigation map by the user through an input interface of the navigation device, and the navigation device generates a navigation route for navigating from the current position and the destination. Then, the navigation device initializes the current position and the navigation map, and sequentially generates a first displaying parameter of the current position and a second displaying parameter of the navigation map. The navigation device dynamically adjusts the first displaying parameter of the current position according to the direction parameter, and dynamically adjusts the second displaying parameter of the navigation map according to the first displaying parameter. And finally, the navigation device displays the current position according to the first displaying parameter, and fetches the corresponding displayed section of the navigation map according to the second displaying parameter and displays the corresponding displayed section of the navigation map in the navigation information frame.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will become more fully understood from the detailed description given hereinbelow for illustration only, and thus are not limitative of the present invention, and wherein:

FIGS. 4A and 4B are the schematic diagrams of the navigation information frames generated by the invention.

DETAILED DESCRIPTION OF THE INVENTION

Figure 1A:
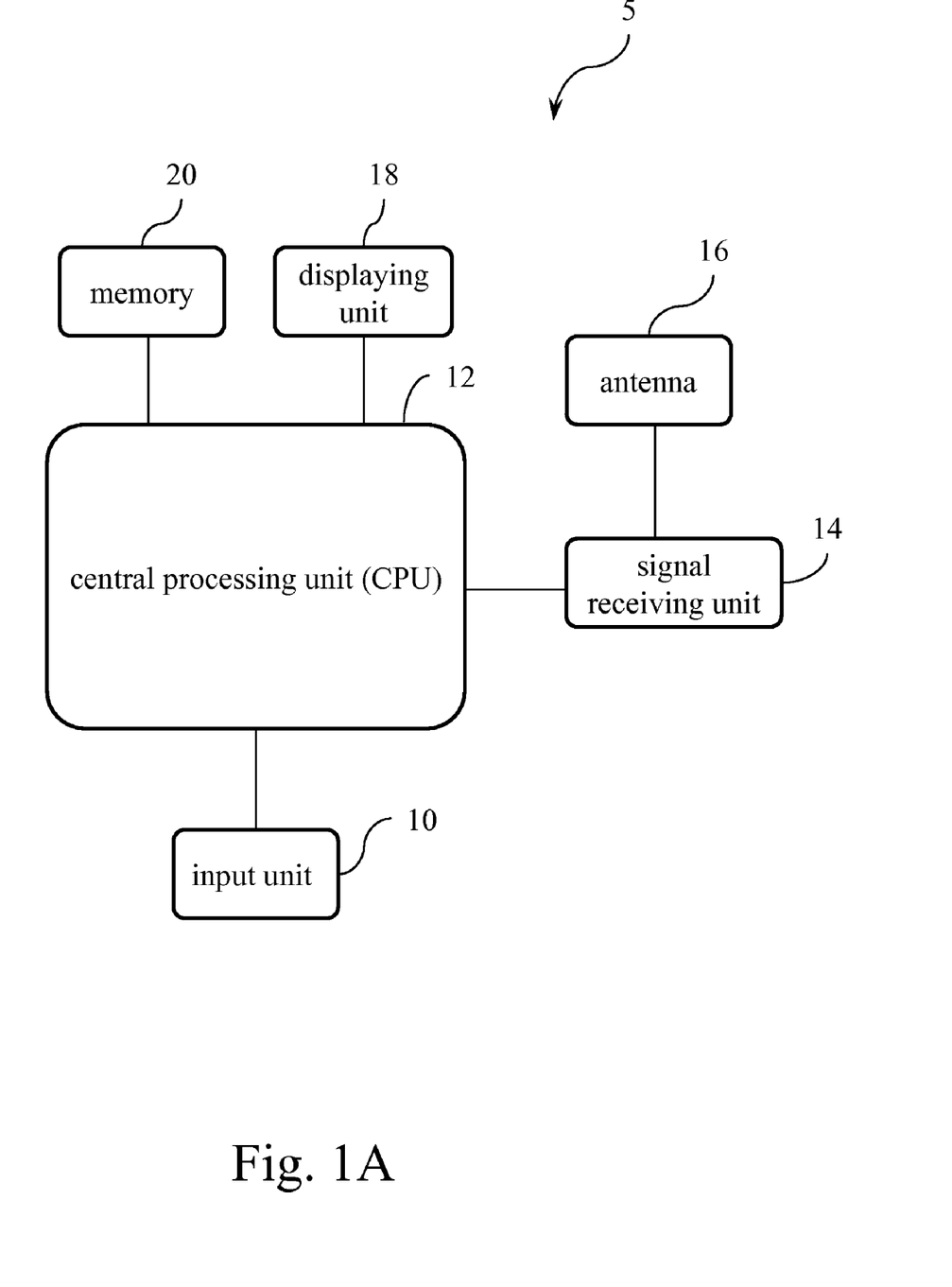
FIG. 1A is a block diagram of a navigation device according a first embodiment of the invention.

Referring to FIG. 1A, a navigation device according to a first embodiment of the invention for displaying navigation information according the traveling direction of the navigation device or its user is provided. The navigation device 5 includes an input unit 10, a central processing unit (CPU) 12, a signal receiving unit 14, an antenna 16, a displaying unit 18, and a memory 20.

The memory 20 is used to store navigation information including a navigation map and a plurality of points of interest (POI, specific point locations that someone may find useful or interesting). Via the antenna 16, the signal receiving unit 14 is used to receive one or more positioning signals transmitted by a positioning system, such as the Global Positioning System (GPS) having a plurality of satellites.

The CPU 12 is electrically connected to the signal receiving unit 14 and the memory 20. The received positioning signal(s) is transmitted form the signal receiving unit 14 to the CPU 12, and the CPU retrieves the current position of the navigation device 5 according to the positioning signal(s). The input unit 10 is electrically connected to the CPU 12 for the user to perform input and control on the navigation device 50. Usually, the most frequently utilized input unit 10 is a keyboard or a touch screen for data input, it could also be the control buttons disposed on the navigation device 5 used for controlling the menu displayed on the navigation device 5.

The displaying unit 18 is electrically connected to the CPU 12 and is used to display the navigation information in a navigation information frame, wherein the navigation information includes the current position (the position of the navigation device 5), the navigation map, and the POI around the current position. Usually, in a navigation device 5, a liquid crystal display is utilized as the displaying unit 18.

As aforementioned, in the actual navigation of the navigation device 5, the CPU 12 retrieves the current position according to the positioning signals received, and then generates a traveling direction icon for the displaying unit 18 displaying in the navigation information frame to illustrate the required traveling direction of the current position (the navigation device 5) along a navigation route. In the navigation information frame of the navigation device 5, the traveling direction displayed is dynamically adjusted according to the change of traveling direction of the current position of the navigation device 5, in particular, the display position of the current position and the displaying scale of the displayed area of the navigation map are dynamically adjusted, so that the user may obtain more route information and POIs from the navigation information frame.

Figure 2A:
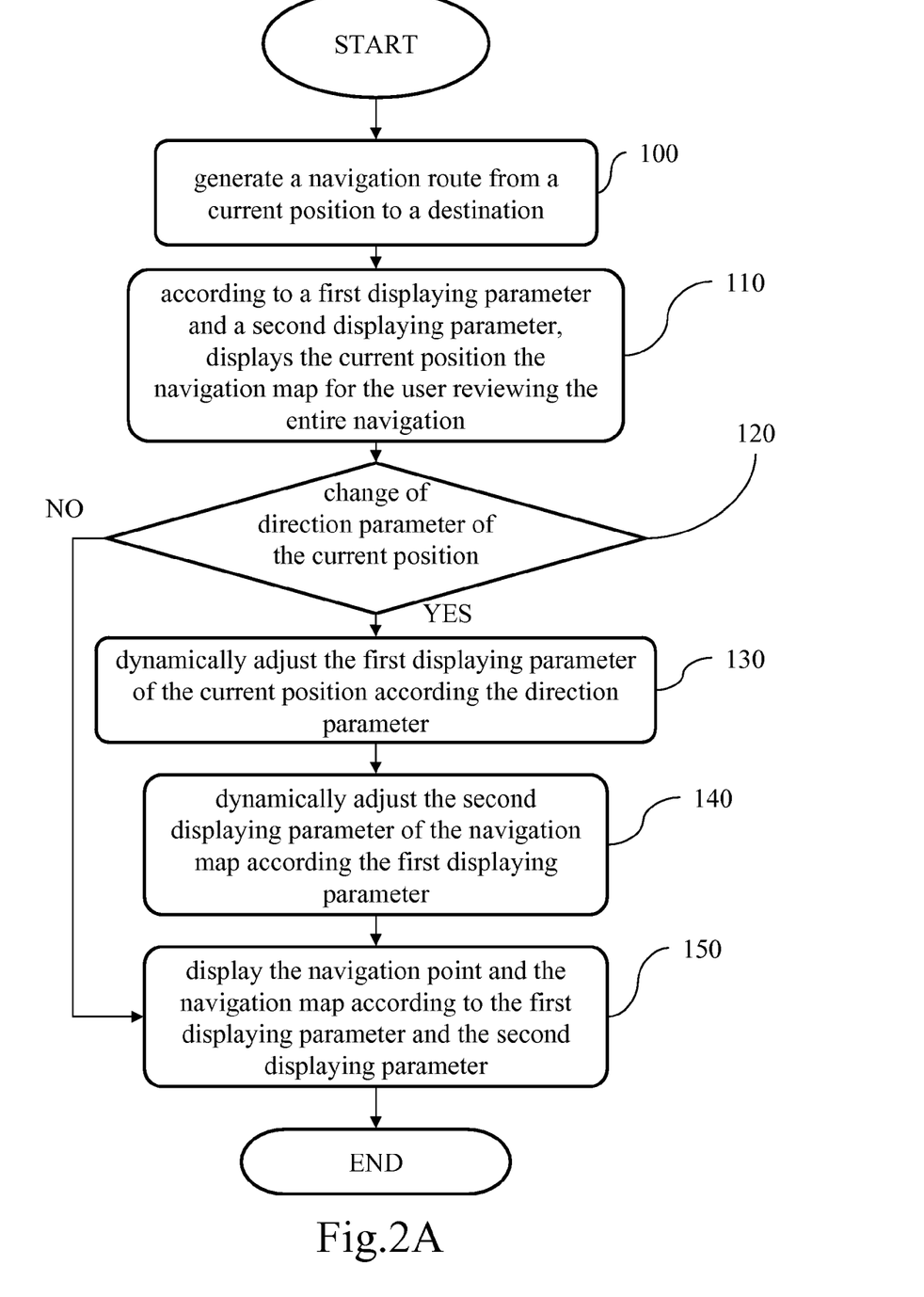
FIG. 2A is a flowchart of the steps of a navigation method according a first embodiment of the invention.

The details of the navigation method are described as follows with reference to FIG. 2A.

Firstly, the signal receiving unit 14 continuously receives the positioning signals via the antenna 16, and transmitted the positioning signals to the CPU 12. The CPU 12 continuously retrieves the current position of the navigation device 5 according to the positioning signals received. And according the traveling direction of the current position of the of the navigation device 5, the CPU 12 determines a direction parameter. Meanwhile, The CPU 12 generates a traveling direction icon in the navigation information frame according to a direction parameter.

Then, set by the user through the input unit 10, the CPU 12 determines a destination (the place that the user is going) on the navigation map and the CPU generates a navigation route from the current position to the destination (step 100).

Next, the navigation device 5 is initialized; the CPU 12 initializes the current position and the navigation map to generate a first displaying parameter of the current position and a second displaying parameter of the navigation map. Then, according to the first displaying parameter and the second displaying parameter, the CPU 12 generates a navigation information frame to the displaying unit 18, so that the displaying unit displays the current position, and the navigation map for the user reviewing the entire navigation (step 110).

Meanwhile, the CPU 12 also determines the change of the direction parameter of the current position (step 120). If the direction parameter is changed, then the CPU 12 dynamically adjusts the first displaying parameter of the current position according the direction parameter (step 130), and subsequently, the CPU 12 dynamically adjusts the second displaying parameter of the navigation map according the first displaying parameter (step 140). And finally, displaying unit 16 displays the current position in the navigation information frame according the first displaying parameter, and the CPU also fetches a corresponding displayed section of the navigation map according the second displaying parameter for the displaying unit 16 displaying the corresponding displayed section of the navigation map in the navigation information frame (step 150).

The first displaying parameter is used to set a displaying position parameter relating to a current position in the navigation information frame. Usually, the first displaying parameter is a pixel coordinate for the current position to be displayed on the navigation information frame.

The second displaying parameter is used to set display scale and the corresponding displayed section required of the navigation map to be displayed in a navigation information frame. Usually, the corresponding displayed section required to be displayed of the navigation map is around the current position with reference to the first displaying parameter. As above-mentioned, in the prior art, in a navigation information frame, the current position is placed at the center, and the corresponding displayed section required to be displayed of navigation map around the current position is determined in a horizontally and vertically symmetric manner, and the display scale of the corresponding displayed section required is usually fixed in the prior art. However, in the present invention, when the current position start to move in the navigation, the first displaying parameter and the second displaying parameter are changed with time, due to the change of traveling direction of the current position.

Basically, the adjustment of the first displaying parameter and the second displaying parameter must be in compliance with the principle that "the direction parameter has reverse relation with the first displaying parameter, and the direction parameter has positive relation with the second displaying parameter". The so-called reverse relation means that, when the direction parameter indicates moving in a north-west direction (namely, toward the upper left corner of the navigation information frame), then the first displaying parameter has to indicate that the direction of current position is to move in a south-east direction (namely, toward the lower right corner of a navigation information frame). Similarly, when the direction parameter indicates moving in a north-east direction (namely, toward the upper right corner of a navigation information frame), then the first displaying parameter has to indicate that the direction of current position is to move in a south-west direction (namely, toward the lower left corner of a navigation information frame). In the realization of the reverse relations, the degrees of longitude and latitude represented by the direction parameter can be utilized and converted into the pixel coordinate of the current position in the reverse relation. Moreover, the so-called positive relation means that, when the direction parameter indicates moving in a north-west direction (namely, toward the upper left corner in a navigation information frame), then the second displaying parameter has to enlarge the display scale of the navigation map in the north-west direction of the current position (namely, toward the upper left corner of a navigation information frame). Similarly, when the direction parameter indicates moving in a north-east direction (namely, toward the upper right corner of a navigation information frame), then the second displaying parameter has enlarge the display scale of the navigation map in the north-east direction of the current position (namely, toward the upper right corner of a navigation information frame). In realization the positive relation, the actual display position of the current position can be converted to obtain the actual proportion size of a navigation map in the various directions that are desired to be displayed around the current position. The proportion relationship of conversion between the direction parameter, the first displaying parameter and the second displaying parameter, in general, can be set freely by one with ordinary skill in the art under the principle described above.

Figure 1B:
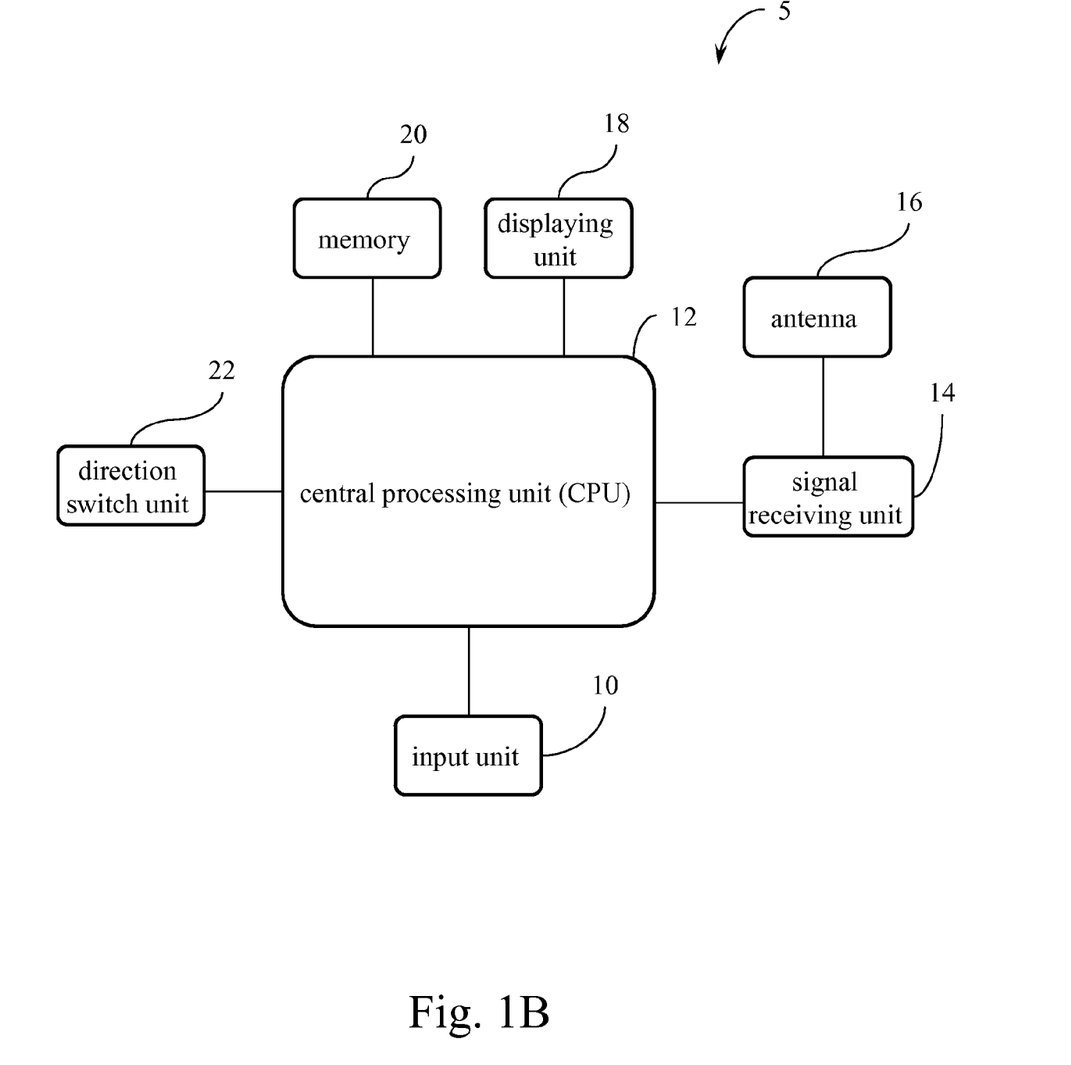
FIG. 1B is a block diagram of a navigation device according a second embodiment of the invention.

To determine the change of direction parameter, basically, it is calculated and obtained by the CPU 12 according to the relations of relative directions between the current position and a navigation route to be navigated through. In addition, the change of direction parameter is provided to the CPU 12 through a signal of an external unit for further processing and determination. Refer to FIG. 1B, which shows a navigation device 5 according to a second embodiment of the invention. Wherein, the difference between the navigation device 5 of FIG. 1B and that of FIG. 1A is that, an additional direction switch unit 22, such as a Gyroscope, is provided and electrically connected to the CPU 12. The direction switch unit 22 is used to provide the direction parameter directly to the CPU 12, when the traveling direction of a current position is changed. Thus, upon receiving a signal transmitted from the direction switch unit 22, the CPU 12 dynamically adjusts the first displaying parameter and the second displaying parameter. As such, the current position and the corresponding displayed section of the navigation map in a navigation information frame are dynamically adjusted by the input signal(s) from the direction switch unit 22.

Figure 2B:
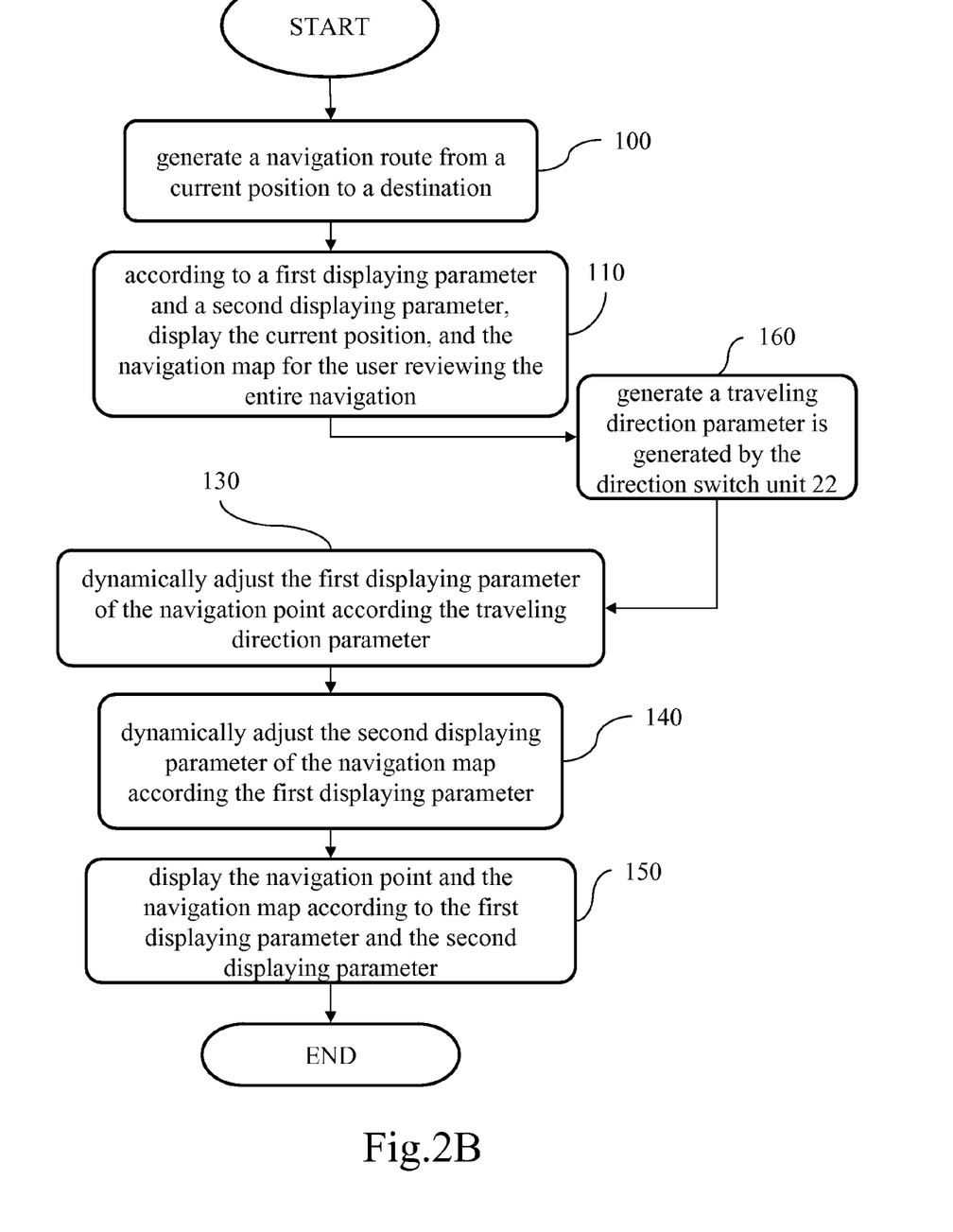
FIG. 2B is a flowchart of the steps of a navigation method according a second embodiment of the invention.

Referring to FIG. 2B, a navigation method applied in the navigation device 5 of a second embodiment is shown. The difference between the first and the second embodiments is that, upon completing the display of the initialized navigation information frame in step 110, the CPU 12 determines the traveling direction of the current position through the input of the direction switch unit 22. When the direction switch unit 22 detects the changes of the traveling direction of the current position, a corresponding direction parameter is generated by the direction switch unit 22 and sent to the CPU 12. Then CPU 12 dynamically adjusts the first displaying parameter and the second displaying parameter directly (step 160). Therefore, the step 120 of determining traveling direction change by the CPU 12 as shown FIG. 2A is not required, and the loading of the CPU 12 is reduced. The flowchart of the subsequent steps is the same as that of FIG. 2A.

Figure 4A:
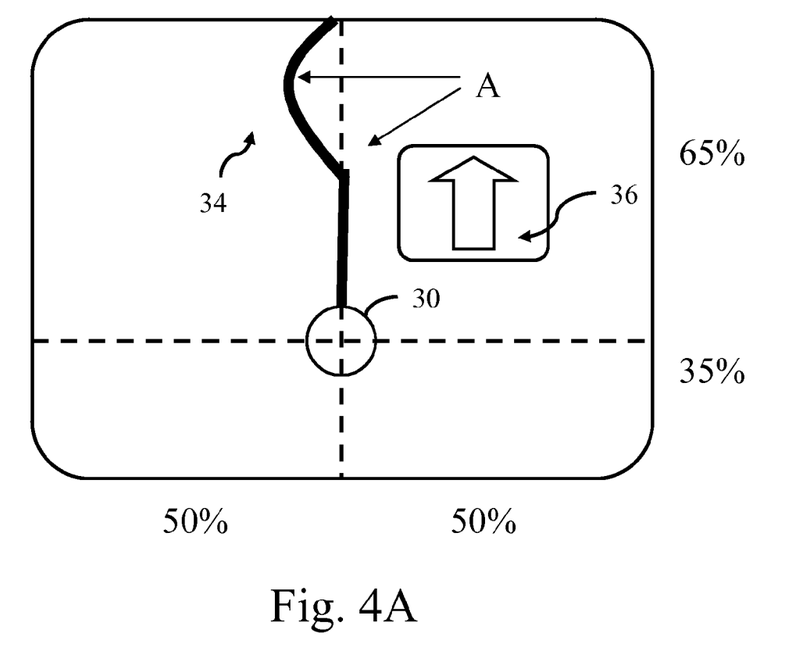

Referring to FIGS. 4A and 4B, the schematic diagrams of navigation information frames according to embodiments of the invention are shown to illustrate the advantages of the present invention.

In FIG. 4A, the traveling direction icon 36 shows that the traveling direction of the current position 30 is given by the navigation device 5 in the north direction (heading toward the upper side of the navigation information frame). That is, the current position 30 has to be located in the lower portion of the navigation information frame in compliance with the principle of reverse relation, so that the user may have much more information about the rest of navigation route 34 and see more points of interest (POIs) on the displayed section of the navigation map when moving straight forward. As shown in FIG. 4A, through the adjustment of the first displaying parameter, it is found that the current position 30 is shown in the lower center portion of the entire navigation information frame. Since the current direction parameter indicates a straight forward movement without leaning toward the left or the right, the adjustment of the first displaying parameter for the display position of the current position 30 has only to be adjusted in a vertical direction in a navigation information frame, adjustment in the horizontal direction is not required. In contrast, the adjustment of the second display parameter has the positive relation with a direction parameter, so that the displaying scale of the navigation map in the vertical direction has to be increased. Finally, as shown in FIG. 4A, the current position 30 is displayed at a position having its left and right display portion ratios of 50% respectively in a navigation information frame in a horizontal direction, and having its upper and lower display portion ratios of 65% and 35% respectively in a vertical direction. For the displayed section of the navigation map, the left and right display portion ratios are 50% in a horizontal direction, and the upper and lower display portion ratios are 65% and 35% respectively. Therefore, the user may obtain much more information of the rest of navigation route 34 and other POIs when he proceeds in a straight forward direction. For example, the user may obtain that there is a left turn ahead in the navigation information frame as shown in FIG. 4A, and then he is able to make sufficient preparation in advance and to take appropriate action.

When the traveling direction given by the navigation device 5 is changed, for example from the straight north direction as shown in FIG. 4A to the northwest direction (toward the upper left direction of the navigation information frame) as shown in FIG. 4B, then the traveling direction icon 36 is changed to point to the northwest direction. Meanwhile, the display on the navigation information frame is adjusted dynamically, thus the current position 30 is displayed at the lower right corner of the navigation information frame. The user is able to obtain much more rest of the route information about the current traveling direction and other POIs. As shown in FIG. 4B, the current position 30 is displayed in a navigation information frame having the left and right display portion ratios of 70% and 30% respectively in the horizontal direction, and having upper and lower display portion ratios of 80% and 20% respectively in the vertical direction. Meanwhile, the left and right display portion ratios of a navigation map in a navigation information frame are 70% and 30% respectively in the horizontal direction, and the upper and lower display portion ratios are 80% and 20% respectively in the vertical direction. As such, the user is able to obtain the navigation information much earlier in advance that navigation route 34 will indicate a curve ahead as shown in FIG. 4B, while moving in a northwest direction, so that he may be well prepared to turn and drive along the curve.

According to the navigation device and navigation method of the invention, the user of the navigation device has much more navigation information about the traveling direction and other scenic spot information. In particular, in the application process of the vehicle navigation device, the user driving the vehicle may obtain in advance much more information about the navigation route 34 and other scenic spot information, thus avoid the driving errors and endangering the driving safety.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A navigation method for displaying navigation information according to a traveling direction of a navigation device, comprising the following steps:
   receiving at least one positioning signal from a positioning system, and retrieving a current position of the navigation device according to the positioning signal, for determining a direction parameter according the traveling direction of the navigation device;
   determining a destination on a navigation map and generating a navigation route for navigating from the current position to the destination;
   initializing the current position and the navigation map to generate a first displaying parameter of the current position and a second displaying parameter of the navigation map;
   dynamically adjusting the first displaying parameter of the current position according to the direction parameter;
   dynamically adjusting the second displaying parameter of the navigation map according to the first displaying parameter; and
   displaying the current position according to the first displaying parameter, and fetching a corresponding displayed section of the navigation map according to the second displaying parameter and displaying the corresponding displayed section of navigation map in a navigation information frame.

2. The navigation method as claimed in claim 1, wherein the first displaying parameter is a pixel coordinate for the current position to be displayed on the navigation information frame.

3. The navigation method as claimed in claim 1, wherein the second displaying parameter is a display scale of the corresponding displayed section of the navigation map to be displayed on the navigation information frame, and the second displaying parameter is generated with the change of the first displaying parameter of the current position.

4. The navigation method as claimed in claim 1, wherein the direction parameter has reverse relation with the first displaying parameter, and the direction parameter has positive relation with the second displaying parameter.

5. The navigation method as claimed in claim 1, further comprising a step of generating a traveling direction icon in the navigation information frame according to the direction parameter.

6. The navigation method as claimed in claim 1, further comprising a step of receiving the direction parameter through a direction switch unit.

7. A navigation device for displaying navigation information according to a traveling direction thereof, comprising:
   a memory for storing a navigation map;
   a signal receiving unit for receiving at least one positioning signals from a positioning system via an antenna;

a central processing unit electrically connected to the signal receiving unit and the memory, for retrieving the current position according to the received positioning signals;

wherein the central processing unit dynamically adjusts a first displaying parameter of the current position and a second displaying parameter of the navigation map, and fetches a corresponding displayed section of the traveling direction of navigation map according to the second displaying parameter when a direction parameter of the current position is changed; and a displaying unit for displaying the current position and the navigation map in a navigation information frame according to the first displaying parameter and the second displaying parameter.

8. The navigation device as claimed in claim 7, wherein the first displaying parameter is a pixel coordinate for the current position to be displayed on the navigation information frame.

9. The navigation device as claimed in claim 7, wherein the second displaying parameter is a display scale of the corresponding displayed section of the navigation map to be displayed on the navigation information frame, the second displaying parameter is generated with the change of the first displaying parameter of the current position.

10. The navigation device as claimed in claim 7, wherein the direction parameter has reverse relation with the first displaying parameter, and the direction parameter has positive relation with the second displaying parameter.

11. The navigation device as claimed in claim 7, wherein the displaying unit further displays a traveling direction icon in the navigation information frame according to the direction parameter.

12. The navigation device as claimed in claim 7, further comprising a direction switch unit electrically connected to the central processing unit.

13. The navigation device as claimed in claim 12, wherein the direction switch units is used to generate the direction parameter to the central processing unit.

14. The navigation device as claimed in claim 7, wherein the central processing unit generates a navigation route for navigation from the current position to a destination, the displaying unit displays the current position according to the first displaying parameter, and the central processing unit fetches the corresponding navigation map according to the second displaying parameter for the displaying unit to display in the navigation information frame.

* * * * *